United States Patent [19]

Denkewalter et al.

[11] 4,410,688

[45] * Oct. 18, 1983

[54] MACROMOLECULAR HIGHLY BRANCHED HOMOGENEOUS COMPOUND

[75] Inventors: Robert G. Denkewalter, Anchorage, Ak.; Jaroslav F. Kolc, Randolph; William J. Lukasavage, Great Meadows, both of N.J.

[73] Assignee: Allied Corporation, Morris Township, Morris County, N.J.

[*] Notice: The portion of the term of this patent subsequent to Jul. 15, 1998 has been disclaimed.

[21] Appl. No.: 329,780

[22] Filed: Dec. 11, 1981

Related U.S. Application Data

[60] Continuation-in-part of Ser. No. 258,707, Apr. 29, 1981, Pat. No. 4,360,646, which is a division of Ser. No. 27,622, Apr. 6, 1979, Pat. No. 4,289,872.

[51] Int. Cl.$^3$ ............................................. C08G 69/10
[52] U.S. Cl. .................................... 528/328; 528/310
[58] Field of Search ............................... 528/328, 310

[56] References Cited

U.S. PATENT DOCUMENTS 4,132,746  1/1979  Urry et al. ........................ 528/328
4,289,872  9/1981  Denkewalter et al. .............. 528/328

*Primary Examiner*—Harold D. Anderson
*Attorney, Agent, or Firm*—Kenneth E. Stroup, Jr.; Richard C. Stewart, II; Alan M. Doernberg

[57] ABSTRACT

Formed from trifunctional units (M) having attached, to one of the two terminal carbon atoms of an alkylene hydrocarbon diradical, the functional group A′, and having attached, to the other terminal carbon atom, a different functional group B′ reactive with A′ to form a linkage AB; and having attached, to a third carbon of the skeleton of unit (M), the functional group A″ (preferably the same as A′) reactive with B′ whereby a macromolecule is built up of successive layers of units (M). The process involves successive stages in the first of which, the functional groups A′ are blocked and group B is blocked with a "source" unit (S); then groups A′ are liberated to form Compound I. In the second stage, Compound II is formed from the starting material (such as lysine) by first blocking groups A′, then converting group B′ to a form reactive with A′. Then a series of growth steps links two molecules of Compound II to each molecule of Compound I via reaction between activated B′ groups of two Compound II molecules, and two liberated A′ groups of Compound I; and the four blocked groups A′ in the two newly added units are liberated to form Compound III. In stage C, the four A′ groups of Compound III are reacted as before with Compound II, and the eight blocked A′ groups of the resultant newly added units (M) are liberated to complete the third stage; and so on. Lysine is illustrative of suitable starting materials. The products can be used as surface modifying agents; as metal chelating agents; and as substrates for preparation of pharmaceutical dosages.

10 Claims, No Drawings

MACROMOLECULAR HIGHLY BRANCHED HOMOGENEOUS COMPOUND

DESCRIPTION

RELATED PATENT APPLICATIONS

This application is a continuation-in-part application of U.S. patent application Ser. No. 258,707, filed Apr. 29, 1981, now U.S. Pat. No. 4,360,646, which in turn is a divisional application of U.S. patent application Ser. No. 027,622, filed Apr. 6, 1979, now U.S. Pat. No. 4,289,872.

BACKGROUND OF THE INVENTION

This invention relates to organic macromolecular compounds, i.e. compounds in which essentially all constituent molecules are alike in composition, chemical structure and size (see *J. Pol. Sci.*, volume VIII, No. 3—"Report on Nomenclature in the Field of Macromolecules"—pages 257–277 at page 258). These compounds are to be distinguished from high polymers wherein the composition is a mixture of homologous polymeric compounds. The subject compounds are branched but not crosslinked and are composed essentially of identical trifunctional units.

High polymers, consisting of a mixture of homologous polymeric compounds, composed of trifunctional units, are well known, in particular in the form of naturally occuring proteins and related natural and synthetic materials. For example, linear polymeric lysine is known in which one of the two amino groups in one lysine unit is combined with a carboxyl group of another lysine unit, to form a chain of lysine units linked by amide (—NHCO—) linkages.

SUMMARY OF THE INVENTION

The compounds of this invention differ from prior art high polymers in that each constituent unit of the macromolecular compounds of this invention can be characterized as being an interior unit, an exterior unit, the source unit, or permissibly a surface unit. Each interior unit (M) is derived from an amino carboxylic acid unit which consists of a tetra- or trivalent hydrocarbon chain of at least 3 carbon atoms having attached, to one of the valencies a carboxyl function and having attached to the remaining valencies amino functions. Thus, in these macromolecular compounds an amino functional group of one unit can react with a carboxyl functional group of another unit forming amide (—NCO—) linkages. As is apparent from the foregoing, in these macromolecular compounds, the interior units (M) are linked one to another by an amide linkage (—NCO—). The amino acid unit can be linked to up to two additional units via an amide linkage formed by its remaining amino functions and carboxy functions of other amino acid units.

The above mentioned exterior units of the subject macromolecules have a structure (M) which is similar to that of the interior units and which are also linked to interior units by amide linkages. In each such exterior unit, at least one of its acid groups is an unreacted pendant functional group; or it forms a linkage between such exterior unit, and a surface unit (R) which is derived from compounds which are different from the said units (M). Said macromolecules contain additionally, one source unit (S) which is derived from a compound having at least one function group therein which is reactive with the amine functional group of an interior unit (M) to form one or more linkages between unit (M) and unit (S), source unit (S) being otherwise unreacted with units (M). In the macromolecular compound of this invention, the total number of units (M), interior and exterior closely approximates $(2^n - 1)$ with "n" being at least 4; and additionally, the macromolecule contain one source unit (S). In this expression "n" is the number of successive layers of units (M) added onto the source unit (S).

A process of producing such macromolecular compounds involves an initiation stage wherein source units (S) are combined with one or more units (M) of the ultimate macromolecule; followed by a series of growth stages, in each of which a set of growth steps is carried out, until a stage is reached at which the desired molecular weight of the macromolecule has been attained.

BRIEF DESCRIPTION OF THE DRAWING

The single FIGURE of the drawing is a two dimensional diagrammatic representation of the structure of the macromolecules of high polymeric compounds of the invention. In the drawing, the straight lines represent the monomeric units of the macromolecules and the angles represent linkages between these monomeric units. The letter S in the drawing designates the "source" unit of the illustrated macromolecule; the letters M designate representative interior and exterior units; and the letters R designate representative surface units different from the M's.

DESCRIPTION OF PREFERRED EMBODIMENTS

In preferred embodiments of the invention, the source unit (S) is linked to one interior unit (M) or to two or more of such units, only via amide linkages involving the amino group of the unit (M). Moreover, when the exterior units are linked in turn to units (R) different from the units (M), the units (R) have thereon a terminal group which is other than amino. This different terminal group can suitably be hydroxyl, carboxy, guanidino, cyano, isocyanato, mercaptol, sulfo or other desired functional group. The terminal groups can be the same in all the (R) units or different in different (R) units; or the (R) units can be inert, e.g. fluorinated.

Preferred amino carboxylic acid compounds which as suitable for use in forming the interior and exterior units (M) of the macromolecular compound of this invention are those of the formula:

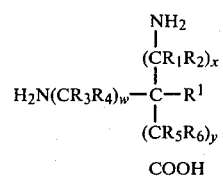

wherein:

$R^1$ is hydrogen or an amino alkyl radical of the formula:

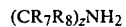

w, x, y and z are the same or different and are individually integers of from 0 to 4, with the proviso that when any one of w, x and z is 0, the others are other than zero;

$R_1, R_2, R_3, R_4, R_5, R_6, R_7$ and $R_8$ are the same or different and are individually hydrogen, hydroxy or lower alkyl having from about 1 to about 6 carbon atoms.

Illustrative of such compounds are lysine, 2,3-diamino propanoic acid, 2,4-diamino butyric acid, and ornithine.

Preferred for use in this invention are amino carboxylic acid compounds in which:

$R^1$ is hydrogen;

each of $R_1$ to $R_6$ is individually hydrogen, methyl or ethyl, with the proviso that no more than three of $R_1$ to $R_6$ is other than hydrogen; and x and y are zero, and w is an integer of from 1 to 4.

Amongst the preferred amino carboxylic acid compounds, those in which $R^1$, and $R_1$ to $R_6$ are hydrogen, and w is an integer of from 1 to 3 are particularly preferred.

Illustrative of useful source units (S) are benzhydrylamine (diphenyl methyl amine), benzylamine, 2-phenyl ethylamine, 1,2-diamino ethane, cyclohexylamine and the like. Amongst these illustrative source units (S) preferred for useful are benzhydrylamine, 1,2-diamino ethane, and the particularly preferred surface unit is benzhydrylamine.

Useful surface units (R) are those having a functional group which is reactive with an amino group. Illustrative of useful surface units are anhydride, p-nitrophenyl ester, 2,4-dinitro phenyl ester, acid halide, isocyanatic group, aride, pentachlorophenyl ester, o-acylisourea and the like. Preferred surface units are p-nitrophenyl ester and o-acylisourea, and the particularly preferred surface unit is p-nitrophenyl ester.

The process of producing the macromolecular compounds of this invention comprises an initiation stage (A), followed by a series of growth stages in each of which a set of growth steps is carried out; the set is repeated unitl the desired molecular weight of the macromolecule is obtained.

Thereafter, if desired, an additional stage can be had in which surface units R, different from the units (M) used initially, can be added to the exterior units (M) composing the surface of the basic macromolecular of the invention.

(A) More specifically our process, illustrated with reference to lysine as the basic constituent of the macromolecules of the invention, comprises combining "source" units, one each, with lysine units in an initiation stage involving;

(1) blocking the amino function of lysine molecules by conversion thereof to urethane, acyl derivatives, benzyl derivatives, sulphonyl derivatives, or like groups; or by protonation or chelation with appropriate reagents.

(2) derivatise or block the carboxyl group of the obtained derivative of lysine formed in step A by linking of the lysine carboxyl group with the "source" unit thus producing a derivative of lysine such as an N-substituted amide and the like, at said carboxyl group, inert toward amino groups, which derivative contains a first lysine unit (M) and a "source" unit (S);

(3) liberating the two amino groups of such first lysine units (M) as for example by hydrolysis of the two when these groups have been derivatised to the urethane groups, thus obtaining Compound (I), the formula of which is symbolized below as Lys(S);

(B) as the second stage, our process begins growth, linking two more lysine units (M) to each of the first lysine units (M) by steps involving:

(1) blocking the two amino groups of lysine as in step (A)(1) above as for example by conversion of each to a urethane group;

(2) converting the carboxyl group of the derivatised lysine, obtained in step (B)(1) above, to a carboxyl derivative reactive with amino groups, such as anhydride, para-nitrophenyl ester, or carboxy chloride or the like; thereby forming Compound II;

(3) contacting the diamino-containing Compound (I), obtained as in step (A)(3) above, with the reactive carboxyl derivative, Compound (II) of step (B)(2) above, to form amide linkages —CONH— and thereby link the lysine unit (M) compound of I via its two amino groups to each of two derivatised lysine units (M) of Compound II via their carboxyl groups; and the liberating four amino groups as for example by hydrolysis of the four newly added urethane groups, thereby forming Compound III, i.e. Lys Lys(S);

(C) as a third stage repeating the steps of blocking or derivatizing lysine amino groups; converting the carboxyls of the resulting derivatives lysines to a reactive derivative, i.e. Compound II; linking four of these Compound II molecules, via their reactive carboxyl derivative, to the four amino groups in each molecule of Compound III; and then liberating the eight amino groups of the four newly added lysine units to form Compound IV;

(D) repeating as desired the set of growth steps of stage (C) above, thereby at each new stage increasing by a factor of essentially 2, the number of lysine units contained in the resulting macromolecule.

It will be recognized that after each successive growth stage, the most recently added lysine units are "exterior" units; and when the next further growth stage is carried out, these exterior units now become additional "interior" units.

Since the total number of exterior units added at each growth stage is double the number of exterior units present at the end of the preceding stage, the total number of units (U) of lysine in the basic macromolecule will be $U = 1 + 2 + 2^2 + 2^3 + \ldots + 2^{n-1}$ after formation of Compound I followed by (n−1) growth stages, or $U = 2^n - 1$. Of these lysine units (M), one is linked via its carboxyl group to the source unit (S); the outermost layer, or $2^{(n-1)}$ units, are exterior units (M); and the remainder are interior units (M).

If desired, as above-indicated, the basic macromolecule of lysine units can be modified by the further process step of reacting some or all of the free amino groups of the exterior units with functional groups of one or more modifying species (R),(R'), ... to add surface units different from the lysine units. For example these (R's) can be derived from aminoacids different from lysine, such as phenylalanine and tyrosine; or can be derived from cyclic anhydrides whereby surface units (R) are linked by amide linkages (—NHCO—) to the exterior lysine units (M) of the basic macromolecule, and these units (R) carry a free carboxyl group as formed by reaction of the cyclic anhydride with the amino groups. Also the surface units (R) can be derived from a compound containing reactive halogen, such as bromoacetic acid, whereby the unit (R) is carboxymethyl of formula —CH$_2$COOH. Carboxyl groups in such surface units can be partially or fully neutralized to the form of a salt, e.g. sodium salt. Another alternative is to introduce particular (R) units, such as fluorinated (R), aromatic (R) or heterocyclic (R) derived from compounds having a group reactive with amino groups, such as an acid halide group. A further alternative is the complexing of amino and/or carboxy groups, at the surface of the macromolecule, with metallic compounds.

Numerous other possibilities of linking various compounds, via reactive substituent groups, with the lysine amino groups, for various purposes, will be readily apparent to those skilled in the art of organic chemistry. Moreover, as another alternative for providing "R" units, free amino groups of lysine can be converted to different groups. For example, such amino groups can be converted by action of phosgene to isocyanate groups; and if desired, these isocyanate groups can be brought into reaction with suitable substituents on organic compounds, such as —OH, —NH$_2$, etc. to provide units (R).

Utility for compounds of the invention is as surface modifiers for any surface toward which these compounds are substantive e.g. surfaces capable of hydrogen bonding with the free amino groups of the above lysine macromolecules; as metal chelating agents via their free groups such as amino and/or carboxy; as substrates for preparation of pharmaceutical dosages; and the like.

The following specific examples are illustrative of our invention and of the best mode presently contemplated by us for carrying out the invention. In the examples, the special abbreviations used are as follows:

BHA = Benzhydrylamine (formula Ph$_2$CHNH$_2$). Used to form "source" unit by blocking the carboxyl group of lysine by formation of the (—CONHCHPh$_2$) amide group.

DBC = Di(t-butyl)dicarbonate (commercially available).

DBL = N,N'-Di(t-butyloxycarbonyl)lysine. L-Lysine with the two amino groups blocked by formation of (t—C$_4$H$_9$OCONH—) urethane groups. (Commercially available).

DBL-PNE = Para-nitrophenyl ester of DBL. To convert DBL carboxyl group to reactive derivative.

DCC = Dicyclohexylcarbodiimide (formula (C$_6$H$_{11}$)N=C=N(C$_6$H$_{11}$)). Used to remove the elements of water from carboxyl groups of lysine, forming the anhydride (reactive with amino, hydroxyl and like groups) and dicyclohexylurea coproduct.

Lys = L-Lysine.

TFA = Trifluoroacetic acid. F$_3$CCOOH. Used to reconvert urethane groups to amino groups.

DAP = L-$\alpha,\beta$-Diaminopropanoic acid

DBA = N,N'-Di-(tert-butyloxycarbonyl)-L-$\alpha,\beta$-diamino propanoic acid

PNE = p-Nitrophenol DBA-PNE = p-Nitrophenyl ester of di-(tert-butyloxycarbonyl)-L-$\alpha,\beta$-diamino propanoic acid.

EXAMPLE I

Preparation of Macromolecular Compound Having Lysine M Units

In summary outline, the procedure described in detail below can be formulated as follows:

| Stage (A) | |
|---|---|
| (1) Lys + DBC | DBL (Diurethane of Lysine) |
| (2) DBL + DCC + BHA | Amide (DBL)(BHA) |
| (3) (DBL)(BHA) + TFA | Diamino form of Lys (BHA), i.e. Cmpd I |
| | (crystallized as dihydrochloride) |
| Stage (B) | |
| (1) Same as (A)(1) | DBL |
| (2) DBL + DCC + p-nitrophenol | DBL-PNE, i.e. Cmpd II |
| (3) 2 Cmpd II + Cmpd I | Diamide, (DBL)$_2$Lys (BHA) |
| (4) (DBL)$_2$(Lys)(BHA) + TFA | Tetramine, Lys$_2$Lys (BHA), i.e. Cmpd. III |
| Stage (C) | |
| (1) Same as (B)(1) | DBL |
| (2) Same as (B)(2) | DBL-PNE, i.e. Cmpd II |
| (3) 4 Cmpd II + Cmpd III | Tetramide, (DBL)$_4$Lys$_2$Lys (BHA) |
| (4) Tetramide + TFA | Octamine, Lys$_4$Lys$_2$Lys(BHA), i.e. Cmpd IV. |

Subsequent stages utilize the same procedure in principle.

STAGE A—Preparation of Lys (BHA) = Compound I

Step 1: DBL can be obtained from lysine as indicated at stage (A)(1) in the above outline; it was purchased.

Step 2: A sample of 10 grams (28.9 mmoles) of DBL was dissolved and brought to 25 ml volume in CH$_2$Cl$_2$. To this were added 5.3 grams (28.9 mmoles) BHA followed by 11.93 grams (57.8 mmoles) DCC and the volume quickly adjusted to 75 ml with additional CH$_2$Cl$_2$. Because of a moderate exotherm an ice water bath was employed for a few minutes to avoid bumping of the volatile CH$_2$Cl$_2$ (b.p. 40° C.).

After one hour the resulting dicyclohexylurea precipitate was filtered off and the cake washed twice with 10 ml portions of CH$_2$Cl$_2$. The filtrate, containing dissolved DBL amide of BHA, was allowed to stand another half hour to observe whether additional urea precipitation occurred. This did not happen and the reaction was considered complete. The filter cake was then dispersed in CH$_2$Cl$_2$ and mixed with TFA to note any evolution of CO$_2$ gas as a spot check for occluded product or unreacted DBL in the filter cake. (The acid will decompose the t-butyloxy urethane groups of any occluded DBL(BHA) or unreacted DBL, with formation of CO$_2$). No bubbles were observed.

The initial filtrate containing DBL(BHA) was then extracted twice with 25 ml portions of water made basic with NaOH to remove unreacted DBL. The filtrate was then dried over about two grams of anhydrous sodium sulfate. The resulting crystal clear amber solution was filtered and the sodium sulfate cake washed twice with 10 ml portions of CH$_2$Cl$_2$. The volume of the filtrate plus washings was reduced to about 25 ml and brought back to 75 ml with TFA to liberate the blocked amino groups, thus decomposing the t-butyl-oxycarbonyl groups to butanol and carbon dioxide and forming Compound I. After about two hours, well after cessation of CO$_2$ bubbling, the volume of the solution was reduced as far as possible by heating in a 50° C. water bath while blowing with N$_2$. The resulting oil was then brought to about 100 ml volume with CH$_3$CN; and this solution was mixed with an excess of HCl dissolved from the gas in EtOH; then was mixed with additional CH$_3$CN until the resulting product, Compound I (as hydrochloride), commenced to crystallize. After about one hour, additional CH$_3$CN was added. As this did not induce further crystallization a thin layer chromatography was run and showed very little product remaining in solution.

Initial yield of the crystallized product, Compound I (as hydrochloride of the diamine) was about 6.75 gram (61% based upon DBL). The product was recrystallized for further purification by first dissolving in a minimum quantity of 90% EtOH/H$_2$O, then precipitating with CH$_3$CN.

STAGE (B)—(Lys)$_2$Lys (BHA)=Compound III

A sample of 2.72 grams of the Compound I (as hydrochloride) was added to 15 ml of dimethylformamide (DMF) and converted to the free amino form by bringing to pH 7-9 with about 1 ml of triethylamine. To this DMF solution, containing the free amino form of Compound I, was added 13.1 grams of Compound II, N,N'-di(t-butyloxycarbonyl) lysine p-nitrophenyl ester (DBL-PNE), obtained by reaction of DBL with DCC and p-nitrophenol essentially by the procedure of Step (A)(2) above. The resulting solution was maintained at pH 8-9 by dropwise addition of triethylamine, and the reaction was monitored of Compound I with Compound II by tlc (thin layer chromatography); it appeared complete both by the tlc analysis and by stability of the pH, at the end of 2½ hours. The resulting solution of N,N'-(DBL)$_2$Lys (BHA) was added to 500 ml of water and was stirred overnight. The precipitate was filtered and washed with water and dried in vacuo at about 40° C. The dry precipitate was washed with 300 ml of diethyl ether and successively with 150 ml portions of diethyl ether until the ether showed no yellow color on treatment with aqueous sodium hydroxide. At this point the cake was essentially colorless. The product, (DBL)$_2$ Lys (BHA), was dried in vacuo at about 40° C. Yield: 6.13 grams (90% of theory).

A sample of 5.8 grams of this product, (DBL)$_2$ Lys (BHA) was added to a mixture of 30 ml of trifluoroacetic acid (TFA) and 30 ml of methylene chloride in a 3-neck flask fitted with a stirrer and a gas collection trap. The amount of CO$_2$ liberated was determined by sweeping the exit gases with nitrogen through a solution of barium hydroxide. The reaction liberated the amino groups, forming Compound III. It was judged complete at the end of an hour; weighing of the dried barium carbonate precipitate indicated essentially 100% evolution of CO$_2$.

STAGE C—(Lys)$_4$Lys$_2$Lys (BHA)=Compound IV

The solution of Compound III from Stage B was evaporated to a thick oil in a 50° C. water bath with a nitrogen sweep. To this was added 25 ml of dimethylformamide (DMF) and the pH adjusted with triethylamine to 7-8 using 13 ml of triethylamine. To this solution was added 23 grams of DBL-PNE, i.e. Compound II, and the reaction of Compound II with the free amino groups of Compound III was allowed to proceed for 40 hours with periodic pH adjustment with triethylamine to maintain the pH above 8; its course was monitored by thin layer chromatography. The reaction solution was then precipitated in 800 ml of water and washed twice with 300 ml of water. The precipitate, (DBL)$_4$Lys$_2$Lys(BHA) was dried in vacuo at 40° C. and washed with 600 ml diethyl ether and successive 300 ml portions of diethyl ether; then was dried in vacuo at 40° C. Yield: 11.3 grams (100% of theory).

A sample of 9.4 grams of this (DBL)$_4$Lys$_2$Lys(BHA) was added to a mixture of 50 ml of TFA and 50 ml of methylene chloride, which was stirred for 70 minutes to liberate the amino groups, forming the octamine, Compound IV, in solution. CO$_2$ evolution was judged complete.

STAGE D—Lys$_8$Lys$_4$Lys$_2$Lys(BHA)=Compound V

The solution of compound IV was evaporated in a 50° water bath to remove excess methylene chloride and TFA. The residue, Compound IV, remained as a thick oil to which was added 35 ml of DMF. The pH was adjusted to 8.9-9.3 with triethylamine, then 37.2 grams of DBL-PNE, i.e. Compound II, was added. The reaction was allowed to proceed for approximately 36 hours, with periodic pH adjustment with triethylamine to maintain the pH above 8, and with analysis by tlc to monitor the course of the reaction. The reaction solution was then precipitated in about 1 liter of water and washed with two 400 ml portions of water. Precipitate was dried in vacuo at 40° C. and washed with 700 ml of diethyl ether and successive 400 ml portions of diethyl ether until the ether wash showed no yellow color with aqueous sodium hydroxide. The product (DBL)$_8$Lys$_4$Lys$_2$Lys (BHA) was dried in vacuo at 40° C. Yield: 14.5 grams (78.4% of theory).

A sample of 5.0 grams of the (DBL)$_8$ product was added to a mixture of 14 ml methylene chloride and 27 ml TFA, which was stirred for two hours at room temperature to liberate the amino groups. The solution of Lys$_8$ Lys$_4$ Lys$_2$Lys(BHA) (Compound V) was then evaporated to remove excess methylene chloride and TFA.

STAGE E—Lys$_{16}$Lys$_8$Lys$_4$Lys$_2$Lys(BHA)=Compound VI

To the remaining oil was added 20.5 ml of DMF and the solution was neutralized to about pH 10 with triethylamine. 17.14 grams of DBL-PNE, i.e. Compound II, was added and the solution was stirred for 24 hours with periodic pH adjustment with triethylamine to maintain the pH above 8. The solution was added to 1400 ml of water and was stirred over the weekend. An additional 1 liter of water was then added. After a period of stirring the mixture was filtered. The cake was washed with water and dried in vacuo at 40° C. The dry precipitate, (DBL)$_{16}$Lys$_8$Lys$_4$Lys$_2$Lys (BHA), was washed with 600 ml of diethyl ether and then with two 600 ml portions of acetonitrile. The product was filtered and dried in vacuo at 40° C. Yield: 8.53 grams (85% of theory).

A sample of 1.83 grams of the (DBL)$_{16}$ product was added to a mixture of 5 ml of methylene chloride and 10 ml of TFA in a flask with a gas absorption train. The amount of CO$_2$ liberated was estimated at 94% of theory based on barium carbonate generated over a two hour period. The solution of Lys$_{16}$Lys$_8$Lys$_4$Lys$_2$(BHA), Compound VI, was then evaporated to remove excess methylene chloride and TFA.

STAGE F—Lys$_{32}$(Lys)$_{31}$(BHA)=Compound VII

The oil was diluted with 7½ ml of DMF and neutralized with triethylamine to pH of about 8.5. To this solution was added 7.44 grams of DBL-PNE, i.e. Compound II. The solution was stirred for 26 hours while the pH was maintained between 26 hours while the pH was maintained between 8-9 by addition of triethylamine. The solution was then added to 300 ml of water. After a settling period the water was decanted; then an additional 300 ml of water was added and the mixture was stirred over the weekend. The mixture was filtered and the cake dried in vacuo at 40° C. and washed with 300 ml of diethyl ether and then with four successive portions of 100 ml each of diethyl ether. Yield of $(DBL)_{32}(Lys)_{31}(BHA)$ 3.46 grams (94.4% of theory).

A sample of 2.0 grams of the $(DBL)_{32}$ product was added to a mixture of 8 ml methylene chloride and 20 ml TFA. The gas evolved during a two hour period was bubbled through a barium hydroxide trap, and the $CO_2$ liberated was estimated at 92% of theory based on barium carbonate recovery. The solution of $Lys_{32}(Lys)_{31}$ (BHA), Compound VII, was then evaporated to remove excess TFA and methylene chloride.

STAGE G—$Lys_{64}(Lys)_{63}(BHA)$=Compound VIII

To the resulting amino product, 7.5 ml of DMF was added. The pH was adjusted to about 8 with triethylamine, and there was added 8.19 grams of DBL-PNE, i.e. Compound II. The pH was maintained between 8–9.5 by addition of triethylamine, and the solution was periodically sampled over a 5-day period, to allow monitoring the reaction by thin layer chromatography. At this point the reaction of carboxyl groups of Compound II with the amino groups of Compound VII was judged complete by use of ninhydrin. The resulting solution of $(DBL)_{64}(Lys)_{63}(BHA)$ was added to 250 ml of water and washed twice with 250 ml of water. The initial precipitation was difficult to filter because of suspended materials and 7 grams of sodium chloride was added to the supernatant to flocculate the suspended materials. The mixture was filtered and the cake dried at 40° C. in vacuo and suspended in 250 ml of acetonitrile. The suspension was filtered and washed three times with 50 ml of acetonitrile. (Acetonitrile was found a more satisfactory wash medium than ether as larger molecular weights were approached because of significant solubility of the larger molecular weight product in ether). Yield: 3.78 grams (94% of theory) of $(DBL)_{64}(Lys)_{63}(BHA)$. A sample of 10 grams of the $(DBL)_{64}$ product was added to a mixture of 10 ml of methylene chloride and 30 ml of TFA, and the solution was stirred for two hours. (20% of the solution was removed for other experiments). The remaining 80% of the batch was evaporated to remove excess methylene chloride and TFA, leaving $Lys_{64}(Lys)_{63}(BHA)$ product, Compound VIII.

STAGE H—$Lys_{128}(Lys)_{127}(BHA)$=Compound IX

Compound VIII was diluted with 26 ml of DMF and adjusted to pH 8–9 with triethylamine (circa 24 ml). 32.4 grams of DBL-PNE, Compound II, was added and the reaction mixture was stirred overnight. The reaction was judged to be essentially complete on the following day but was given an extra three days of stirring. The solution was added to 1500 ml of water and washed successively with 750 ml portions of water. The precipitate was filtered and dried in vacuo at 40° C. and then extracted with 800 ml acetonitrile and then washed successively with four 800 ml portions until the wash showed no yellow color on addition of triethylamine. The precipitate was dried in vacuo at 40° C. Yield: 13.6 grams (85% of theory) of $(DBL)_{128}(Lys)_{127}(BHA)$.

A sample of 0.5 grams of the $(DBL)_{128}$ product was dissolved in a mixture of 3 ml methylene chloride and 10 ml TFA and allowed to stand for two hours until evolution of $CO_2$ was complete. The excess solvent was then evaporated leaving $Lys_{128}(Lys)_{127}(BHA)$ product, compound IX, an oil.

STAGE I—$Lys_{256}(Lys)_{255}(BHA)$=Compound X

To Compound IX there was added 4 ml of DMF and the solution was neutralized with triethylamine to an apparent pH of 8–9; then 2.05 grams of DBL-PNE, i.e. Compound II, was added. The pH was maintained alkaline by additions of triethylamine throughout the reaction period which was continued for four days. The reaction mixture was then precipitated with 500 ml of water and washed with successive portions of water. The cake was dried in vacuo and extracted with acetonitrile. Some of the precipitate remained suspended in the acetonitrile wash; small amounts of triethylamine were added to help flocculate the material. At each stage of the wash it was necessary to centrifuge the suspension in order to get adequate recovery of product. After washing was complete, the product was dried in vacuo at 40° C. Yield: 900 mg. (90% of theory) of $(DBL)_{256}(Lys)_{127}(BHA)$. A sample of 0.5 g of the $(DBL)_{256}$ product was dissolved in 5 ml methylene choride and 10 ml TFA and allowed to stand for two hours until evolution of $CO_2$ was complete. The excess solvent was evaporated leaving $Lys_{256}(Lys)_{127}(BHA)$ product, Compound X, an oil.

STAGE J—$Lys_{512}(Lys)_{511}(BHA)$=Compound XI

To Compound X there was added 4 ml of DMF. The solution was neutralized with triethylamine to an apparent pH of about 8 and 2.05 grams of DBL-PNE i.e., Compound II, was added. The pH was maintained by dropwise periodic addition of triethylamine over 4 days. The reaction mixture was precipitated with 500 ml of water and washed with two successive 200 ml portions of water. The cake was washed with successive portions of about 30 ml of acetonitrile in centrifuge tubes until the acetonitrile showed no color on addition of sodium hydroxide. In order to have the suspended materials centrifuge properly, small amounts of triethylamine were added to help by flocculating the product. After the washing was complete the product was dried in vacuo at 40° C. Yield: 630 mg. (63% of theory) of $(DBL)_{512}(Lys)_{511}(BHA)$. A sample of 1.28 g of the $(DBL)_{512}$ product was dissolved in 12.8 ml of methylene chloride and 25.6 ml TFA and the evolution of $CO_2$ was monitored by trapping with barium hydroxide solution; the recovery of $CO_2$ was in excess of 80% of theory. The solution was then evaporated to leave an oil $Lys_{512}(Lys)_{511}(BHA)$=Compound XI.

STAGE K—$(DBL)_{1024}(Lys)_{1023}(BHA)$=Compound XII.

This Compound XI was dissolved in 6 ml of DMF and neutralized with about 4 ml of triethylamine. To the resulting solution was added 5.2 g. of DBL-PNE, i.e. Compound II; the solution was stirred for 4 days while maintaining the pH between 8–9 with triethylamine. At the end of this time the reaction was checked by tlc using fluorescamine as an indicator. The test was negative for free amino groups. The solution was then precipitated in 1400 ml of water, the precipitate was washed with water and dried in vacuo. The precipitate was then extracted with 400 ml of acetonitrile and washed until free of nitrophenol and nitrophenylester. Triethylamine was added during the washing to facilitate separation of the precipitate. The product was dried in vacuo at 40° C. Yield: 1.7 g. (67% of theory) of $(DBL)_{1024}(Lys)_{1023}(BHA)$, Compound XII.

It will be appreciated that at very high molecular weights, the macromolecular products designated by the formulae given above may not conform precisely to the theoretical formulae, $U=2^n-1$. In particular, the essentially spherical geometry of the macromolecule means that as molecular weight increases, the ratio of surface of the macromolecule; exterior units decreases, i.e, the exterior portion of the macromolecule become more crowded; and mutual interferences among the exterior units therefore increase, restricting the freedom of the exterior units to react with additional lysine molecules. However, the solubility of the product confirms that it is not cross-linked.

The amino groups of the $(DBL)_{1024}$, which attach t-butyloxycarbonyl surface units to exterior lysine units, can be liberated; and can, if desired, be further reacted with Compound II or with any other desired molecule containing a group which is reactive with amino groups thereby linking new exterior lysine units or various surface units (R) to these exterior lysine units (M). Such reactive groups include anhydride, acid halide, isocyanato, halo, and the like.

EXAMPLE II

Preparation of a Macromolecular Compound Having 2,3-Diamino propanoic Acid (M) Units In summary outline, the procedure described in detail hereinbelow can be formulated as follows:

| Stage (A): | |
|---|---|
| 1. DAP + DBC | DBA |
| 2. DBA + BHA + DCC | DBA(BHA) |
| 3. DBA(BHA) + TFA | DAP(BHA) |
| Stage (B): | |
| 1. Same as (A)(1) | DBA |
| 2. DBA + PNE + DCC | DBA-PNE |
| 3. 2DBA - PNE + DAP(BHA) | (DBA)$_2$(DAP)(BHA) |
| 4. (DBA)$_2$(DAP)(BHA) + TFA | (DAP)$_2$(DAP)BHA |
| Stage (C): | |
| 1. Same as (B)(1) | DBA |
| 2. Same as (B)(2) | DBA-PNE |
| 3. 4DBA-PNE + 1(DAP)(DAP)PHA + DCC | (DBA)$_4$(DAP)$_2$(DAP)BHA |
| 4. (DBA)$_4$(DAP)$_2$(DAP)BHA + TFA | (DAP)$_4$(DAP)$_2$(DAP)BHA |

Preparation of subsequent stages utilize substantially the same procedure.

STAGE A—Preparation of DAP(BHA)=Compound I'

Step 1

DAP monohydrochloride (purchased from Chemical Dynamics Corp.) (4.34 g; 30.9 mmol) was dissolved in a solution of NaOH (2.46 g) in water (6 mL) and t-butanol (13 mL) added. To this mixture was added DBC (15.0 g; 6.87 mmol) dropwise over a period of 1 hour at room temperature. Another 13 mL of t-butanol were added and the reaction mixture was stirred overnight at room temperature. The mixture use then diluted with water (30 mL), extracted with pentane (4×40 mL which was discarded) and ethyl acetate (4×50 mL). The combined ethyl acetate extracts were dried over Na$_2$SO$_4$ (10 g), and the solvent evaporated in vacuum. The product (DBA) is a colorless viscous liquid, sharing a single spot on TLC in 2 systems (A and B), with a different $R_F$ value than the lysine derivative.

| TLC System | $R_F$ for DBA | $R_F$ for DBL |
|---|---|---|
| A | 0.64 | 0.80 |
| B | 0.68 | 0.72 |

Step 2

A solution of DBA (456 mg; 1.5 mmol) in CH$_2$Cl$_2$ (2 mL) was added to BHA (366 mg; 2.0 mmol). To this solution was added DCC (309 mg; 1.5 mmol) dissolved in CH$_2$Cl$_2$ (3 mL). The reaction mixture was allowed to stand overnight at room temperature. The separated dicyclohexylurea was filtered off, the filtrate was extracted with 1% aqueous HCl, water, 5% NaHCO$_3$, water, and dried over Na$_2$SO$_4$. The solvent was evaporated and 600 mg of product obtained represented a 85% yield. TLC analysis provided a single spot ($R_2$0.80, silicagel, eluent CH$_2$Cl$_2$-ethanol, 16:1). The amino groups were diblocked by treatment with TFA (2 ml) in CH$_2$Cl$_2$ (2 ml) for 90 minutes at room temperature; forming the compound I'. Solvent was evaporated, thereby anhydrous ether (5 mL) added, and HCl gas introduced for 5 minutes. Ether was evaporated in vacuum, the residue dried over P$_2$O$_5$ and crystallized from ethanol as colorless needles.

STAGE B—Preparation of DBA-PNE (Compound II')

To a solution of DBA (1.5 g; 5 mmol) and p-nitrophenol (0.7 g; 5 mmol) in 20 ml of ethylacetate was added a solution of DCC (1.04 g; 5 mmol) in 15 ml of ethylacetate dropwise. The reaction mixture was stirred at room temperature for 4 hours. Thin layer chromatography shows only one spot, plus a small amount of free p-nitrophenol). After removing the dicylclohexylurea the solvent was evaporated in vacuum and DBA-PNE obtained in form of a viscous liquid.

Preparation of (DAP)$_2$DAP(BHA)=Compound III'

A solution of DBA (304 mg, 1.0 mmol) in CH$_2$Cl$_2$ (3 ml) was added to a solution of Compound I' in the hydrochloride from (171 mg; 0.5 mmol) in CH$_2$Cl$_2$ (2 ml), which was neutralized with triethylamine. A solution of DCC (206 mg; 1.0 mmol) in CH$_2$Cl$_2$ (2 ml) was added at room temperature. The reaction mixture was stirred overnight, dicyclohexylurea was filtered off and the filtrate treated as described in Stage A', Step 2. TLC of the product: $R_F$ 0.45 on silicagel, eluent CH$_2$Cl$_2$-ethanol, 20:1. The product (132 mg) was treated with 50% TFA in CH$_2$Cl$_2$ (3 ml), the solvents was evaporated in vacuum. The residue was dissolved in CH$_2$Cl$_2$ (5 mL) and used for the next step (Stage C').

Stage C—Preparation of DAP$_4$DAP$_2$DAP(BHA)=Compound IV'

To a solution of Compound III' prepared in the previous stage (B) added, 5 drops of triethylamine a solution or DBA (182 mg) in CH Cl (2 ml) and a solution of DCC (124 mg) in CH$_2$Cl$_2$ (2 mL). The reaction mixture was stirred at room temperature, the pH checked periodically and adjusted to 7-8 by addition of triethylamine. Stirring was continued overnight. The reaction mixture was treated as described in Stage B above. TLC analyses shows only one spot. ($R_F$=0.40 on silicagel with CH$_2$Cl$_2$:ethanol, 12:1 as the eluent). The same product could be prepared using DBA-PNE (Compound II) instead of DBA and DCC.

Stage D—Preparation of DAP₈DAP₄DAP₂DAP(BHA)-Compound V′

The above identified compound V can be prepared in accordance with the procedure of the previous stages. To a solution of compound VI prepared in previous stage C, is added effective amounts of triethylamine, solutions of DBA and DCC in $CH_2Cl_2$. The reaction mixture is stirred at room temperature, and the pH is adjusted to about 7–8 with additional triethylamine. Stirring is continued overnight followed by work-up in accordance with the procedures of the previous stages to provide the desired compound V.

It will be recognized that, applying the same principles illustrated by the above example, macromolecules of similar structure can be formed from other diamino carboxy compounds, from dicarboxy amino compounds; and in general from tri- or quadra functional compounds having attached, to a tri or quadravalent hydrocarbon chain of at least 2 carbons, having attached to different carbon atoms of such chain two or three amino groups and having attached to a carbon atom of said chain a carboxyl function. It is apparent that a macromolecular compound in accordance with this invention can be built up stage by stage via consecutive reactions of carboxyl groups with all amino groups obtained at the preceding stage. Moreover instead of a monofunctional compound such as BHA to form the "source" unit (S), a difunctional compound such as ethylene diamine can be used to link the source unit to each of two amino carboxylic acid molecules via their carboxyl groups; or any desired compound, monofunctional, difunctional or polyfunctional, capable of linking to the carboxyl group of an amino acid but inert toward its amino groups, can be used.

Certain representative embodiments of the present invention have been shown in detail for the purpose of more particularly illustrating the inventin. It will be apparent to those of skill in the art that various changes and modifications can be made herein without departing from the scope and spirit of the invention.

What is claimed is:

1. An organic macromolecular compound in which essentially are constituent macromolecules are alike in composition, chemical structure, and size and composed of identical trifunctional units (M), interior and exterior, each interior units having attached, to one of the two terminal carbon atoms of an alkylene hydrocarbon diradical of at least 3 carbons, a carbonyl moiety A of one functional group A′, and having attached to the other terminal carbon atom of such diradical, an amino moiety B of a different functional group B′ reactive with the group A′, said moieties A and B serving to link a carbon atom of one such interior unit (M) to a carbon atom of a second like unit by a linkage AB; and such one interior unit having attached, to a third carbon atom in its skeleton, a second carbonyl moiety (A) of the functional group A′ reactive with group B′ and serving to link said one interior unit to a third like unit, via said moiety A and said moiety (B) being attached to a carbon atom of said third unit (M); and the aforesaid exterior units being linked to interior units by linkages AB; the total number of units (M), interior and exterior, in such macromolecule being essentially $2^n - 1$ with n being the number of successive layers of units (M) added onto a source unit (S), and being at least 4; each exterior unit having at least one of its two moieties A in the form of a part of an original unreacted functional group, or in the form of a linkage between such exterior unit and a surface unit (R) different from the said units (M); and said macromolecule containing additionally one source unit (S) having at least one of said A or B moieties therein linking the unit (S) on an interior unit (M) via said moiety B being attached to a carbon atom of unit (M); source unit (S) being linked with units (M) only via one or more linkages with said moiety B or unit (M).

2. An organic macromolecular compound which comprises at least four successive layers of an amino carboxylic acid unit, said unit comprised of a trivalent or quadravalent saturated hydrocarbon chain of at least 2 carbon atoms having substituted thereon two or three amino groups and one carboxyl group each substituted at one of said valencies with the proviso that said amino groups are substituted on different carbon atoms of said chain, wherein:

said first of said layers consists of one of said amino dicarboxylic acid units which is linked as an amide group via a carbonyl residue of its carboxyl group to an amino acid group of a compound (S) in which amino functions are the only functions reactive with said amino acid;

said second of said layers consists of two of said amino carboxylic acid units, each of which is linked or an amide via its respective carbonyl moiety of its carboxyl group to one of said amino groups of said unit of said first layer;

said third layer consisting of four of said amino carboxylic acid units, each of which is linked as an amide via its respective carbonyl moiety of its carboxyl group to one of said amino groups of said two units of said second layer;

said fourth layer consisting of eight amino carboxylic acid units, each of which is linked as an amide via its carbonyl moiety of its carboxyl group to one of said amino group of said four unit of said third layer; and each of said successive layers consisting of amino carboxylic acid units, each of which is linked as an amide via its respective carbonyl moiety of its carboxyl group to one amino group of a unit of said preceding layer wherein n is the number of successive said successive layers.

3. A macromolecular compound according to claim 2 wherein said amino carboxylic acid is of the formula:

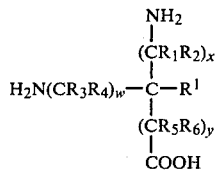

wherein:

R¹ is hydrogen or an amino alkylene radical of the formula:

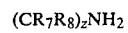

w, x, y and z are the same or different and are individually integers of from 0 to 4, with the proviso that when any one of w, x and z is 0, the others are other than zero;

R₁, R₂, R₃, R₄, R₅, R₆, R₇ and R₈ are the same or different and are individually hydrogen, hydroxy or lower alkyl having from about 1 to about 6 carbon atoms.

4. A compound according to claim 3 wherein $R^1$ is hydrogen.

5. A compound according to claim 3 wherein each of $R_1$ to $R_8$ is hydrogen, methyl or ethyl.

6. A compound according to claim 5 wherein $R^1$ is hydrogen, x and y are 0 and w is an integer from 1 to 4.

7. A compound according to claim 6 wherein w is an integer from 1 to 3.

8. A compound according to claim 1 wherein S is benzhydrylamine.

9. A compound according to claim 1 further comprising an outermost layer consisting of surface units, in each of which a carbonyl function is linked as an amide to one amino function in an amino acid unit of the layer below, which surface units from said amino acid unit.

10. A compound according to claim 2, 3, 4, 5, 6 or 7 wherein all of the amino carboxylic acid units of said compounds are the same.

* * * * *